US008499867B2

(12) United States Patent
Marcacci et al.

(10) Patent No.: US 8,499,867 B2
(45) Date of Patent: Aug. 6, 2013

(54) CONTROL METHOD OF A HYBRID DRIVE ASSEMBLY FOR VEHICLES AND A HYBRID DRIVE ASSEMBLY USING SAID METHOD

(75) Inventors: Maurizio Marcacci, Leghorn (IT); Luca Carmignani, Pisa (IT); Paolo Capozzella, Frosinone (IT); Alessandro Caleo, Massa Carrara (IT)

(73) Assignee: Piaggio & C. S.p.A., Pontedera (PI) (IT)

( * ) Notice: Subject to any disclaimer, the term of this patent is extended or adjusted under 35 U.S.C. 154(b) by 912 days.

(21) Appl. No.: 12/308,359

(22) PCT Filed: Jun. 12, 2007

(86) PCT No.: PCT/IB2007/001812
§ 371 (c)(1),
(2), (4) Date: Dec. 11, 2008

(87) PCT Pub. No.: WO2007/144765
PCT Pub. Date: Dec. 21, 2007

(65) Prior Publication Data
US 2010/0170733 A1    Jul. 8, 2010

(30) Foreign Application Priority Data
Jun. 15, 2006  (IT) ................ MI2006A1157

(51) Int. Cl.
*B60W 20/00*  (2006.01)
(52) U.S. Cl.
USPC .................... 180/65.285; 180/65.31
(58) Field of Classification Search
USPC .............. 180/65.28, 65.265, 65.285
See application file for complete search history.

(56) References Cited

U.S. PATENT DOCUMENTS

| 5,193,634 | A | * | 3/1993 | Masut | 180/65.25 |
| 5,841,201 | A | * | 11/1998 | Tabata et al. | 290/40 C |
| 6,109,127 | A | * | 8/2000 | Liau | 74/336 B |
| 6,155,366 | A | * | 12/2000 | Lin | 180/65.25 |
| 6,344,008 | B1 | * | 2/2002 | Nagano et al. | 475/1 |
| 6,659,910 | B2 | * | 12/2003 | Gu et al. | 477/6 |
| 6,724,165 | B2 | * | 4/2004 | Hughes | 318/376 |
| 6,945,347 | B2 | * | 9/2005 | Matsuno | 180/242 |
| 6,965,824 | B2 | * | 11/2005 | Ichimoto et al. | 701/113 |
| 6,971,968 | B2 | * | 12/2005 | Imazu et al. | 477/2 |

(Continued)

FOREIGN PATENT DOCUMENTS

| EP | 1 340 645 A | 9/2003 |
| EP | 1 518 379 A | 3/2005 |
| EP | 1 518 737 A | 3/2005 |

OTHER PUBLICATIONS

PCT Search Report dated Jun. 4, 2008.

*Primary Examiner* — Jeffrey J Restifo
(74) *Attorney, Agent, or Firm* — Hedman & Costigan, P.C.; James V. Costigan; Kathleen A. Costigan

(57) ABSTRACT

The present invention relates to a management method of the functioning mode of a hybrid drive assembly for vehicles, in particular scooters, and a hybrid drive assembly, comprising at least one internal combustion engine and an electric machine, using the method. The method according to the invention comprises the phases of determining a desired torque and a vehicle state on the basis of a set of received input parameters and/or commands and is characterized in that it comprises the phases of operating the internal combustion engine so that it does not provide torque and operating the electric machine so that it functions as generator for charging an accumulator.

28 Claims, 6 Drawing Sheets

U.S. PATENT DOCUMENTS

| | | | |
|---|---|---|---|
| 7,264,070 B2 * | 9/2007 | Shimizu | 180/65.25 |
| 7,296,648 B2 * | 11/2007 | Tatara et al. | 180/242 |
| 7,306,064 B2 * | 12/2007 | Imazu et al. | 180/65.285 |
| 7,351,265 B2 * | 4/2008 | Vitale et al. | 180/65.51 |
| 7,356,391 B2 * | 4/2008 | Matsuda et al. | 701/22 |
| 7,383,902 B2 * | 6/2008 | Matsuzaki et al. | 180/65.285 |
| 7,413,042 B2 * | 8/2008 | Saitou et al. | 180/65.285 |
| 7,445,066 B2 * | 11/2008 | Hommi et al. | 180/65.26 |
| 7,455,133 B2 * | 11/2008 | Kaneko et al. | 180/65.285 |
| 7,475,746 B2 * | 1/2009 | Tsukada et al. | 180/65.28 |
| 7,520,351 B2 * | 4/2009 | Uchisasai et al. | 180/65.245 |
| 7,591,339 B2 * | 9/2009 | Sugimoto et al. | 180/242 |
| 7,607,505 B2 * | 10/2009 | Yang | 180/242 |
| 7,609,011 B2 * | 10/2009 | Yatabe et al. | 318/140 |
| 7,617,894 B2 * | 11/2009 | Ozeki et al. | 180/65.21 |
| 7,730,983 B2 * | 6/2010 | Tanaka et al. | 180/65.285 |
| 7,774,108 B2 * | 8/2010 | Nakasako et al. | 701/22 |
| 7,784,574 B2 * | 8/2010 | Shirazawa et al. | 180/65.265 |
| 8,047,321 B2 * | 11/2011 | Martini et al. | 180/220 |

* cited by examiner

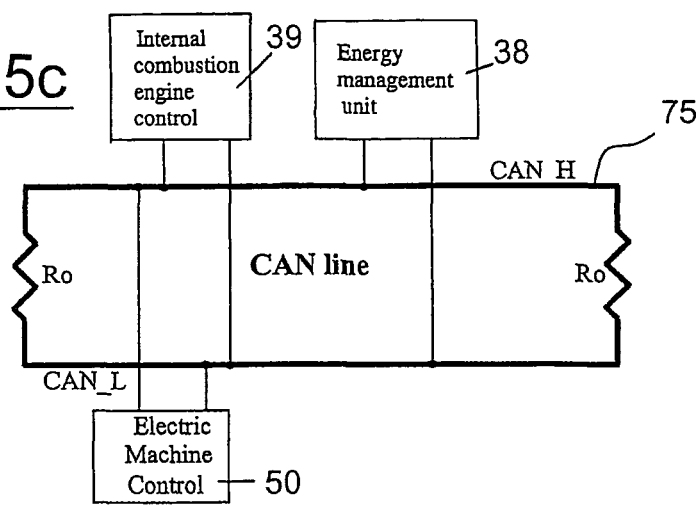
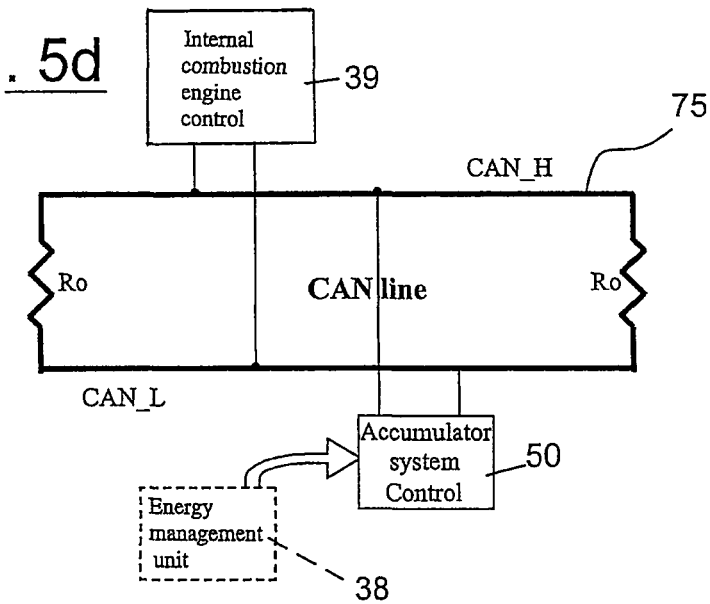

Trends of the torques used in the control

CONTROL METHOD OF A HYBRID DRIVE ASSEMBLY FOR VEHICLES AND A HYBRID DRIVE ASSEMBLY USING SAID METHOD

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

The present invention relates to a control method of the functioning mode of a hybrid drive assembly for vehicles, in particular scooters, and a hybrid drive assembly using said method.

BACKGROUND OF THE INVENTION (1) Field of the Invention

As is known, there are already road vehicles, in particular motor vehicles, using hybrid drive assemblies, i.e. vehicles in which an internal combustion engine and an electric motor are used in combination with each other.

(2) Description of Related Art

The known hybrid solutions allow the alternative or combined use of the two propulsion systems: according to a first known combined configuration, called "hybrid series", the internal combustion engine has the sole function of entraining an electric current generator, which recharges the batteries which charge the electric motor; the propulsion is therefore exclusively effected by the electric motor.

This solution offers the advantage of substantially reducing the consumptions as the internal combustion engine only has to supply the average power and can therefore function under stationary and optimized conditions.

In a second configuration, known as the "hybrid parallel" configuration, both internal combustion and electric engines are connected at the driving wheels through specific transmission kinematic mechanisms.

The known hybrid drive assemblies have the disadvantage of having complex structures, being costly and require a high encumbrance, with the result that there are only a few applications of this type of hybrid system on motor-vehicles having reduced dimensions such as scooters.

In particular, Italian patent application TO2002A001088 describes a hybrid drive assembly for scooters which uses an electric machine coaxial to the centrifugal clutch of the transmission unit interposed between the drive shaft of the internal combustion engine and transmission shaft. In this case, the rotor of the electric machine is integral with the clutch bell.

The known hybrid drive assembly for scooters is operated according to a method which comprises the following operative modes:

"thermal", in which the propulsion is exclusively supplied by the internal combustion engine;

"electric", in which the propulsion is exclusively supplied by the electric machine;

"hybrid parallel", in which the internal combustion engine and the electric motor contribute to supplying the driving power; and "hybrid series", in which the internal combustion engine is exclusively used for the entrainment of an electric generator for recharging the batteries, whereas the propeller torque to the driving wheel is supplied by the electric machine alone.

The combined operative modes currently known for the piloting of a hybrid drive assembly for scooters are not capable of optimizing the energy consumption of the vehicle and guaranteeing a charge level of the batteries at a predefined value. They only envisage, in fact, the possibility of supplying the torques of both engines to the driving wheel or charging the batteries through the internal combustion engine whereas the electric motor supplies the torque required.

In this latter case, the use of a specific current generator is also necessary, as the electric machine is engaged in acting as a motor and it is therefore not possible to exploit its reversibility characteristic.

What the present invention proposes to undertake is to eliminate the disadvantages reported above in known types of methods for managing the functioning modes of hybrid drive assemblys, by conceiving a method which is capable of guaranteeing a high functioning performance in terms of optimization of the energy control.

BRIEF SUMMARY OF THE INVENTION

The invention provides a management method of the functioning mode of a hybrid drive assembly of a vehicle, in particular a scooter, comprising at least one internal combustion engine (3) and an electric machine (32), the method comprising the phases of: a) determining a required torque and a vehicle state based on a series of received input parameters and/or commands; and characterized in that it comprises the phases of: b) operating said internal combustion engine (3) so that it does not supply torque and operating the electric machine (32) so that it functions as a generator for charging an accumulator system (36), when said torque required is negative; c) operating said internal combustion engine (3) and/or said electric machine (32) so as to satisfy said required torque; and/or bring said accumulator system (36) to a pre-established charge level and/or operate said internal combustion engine (3) under maximum efficiency regime conditions, when the torque required is positive and lower than the maximum torque which can be supplied by said internal combustion engine (3); d) operating said internal combustion engine (3) and/or said electric machine (32) supplying propulsive torque, in order to satisfy said torque required, when said torque required is positive and higher than the maximum torque which can be supplied by said internal combustion engine (3)

Within this undertaking, an objective of the present invention is to provide a management method of the function modes of hybrid drive assemblys capable of controlling the charge level of the batteries, during functioning in a combined mode, in order to keep it at a pre-established level.

A further objective of the present invention is to conceive a hybrid drive assembly using this management method of the operative modes.

This undertaking and other objectives are achieved by the management method of the functioning modes of a hybrid drive assembly for a vehicle, in particular a scooter, according to claim 1.

BRIEF DESCRIPTION OF THE SEVERAL VIEWS OF THE DRAWINGS

Further characteristics and advantages of the present invention will appear more evident from the description of a preferred but non-limiting embodiment of the management method of the functioning modes of hybrid drive assemblys according to the invention, indicated indicatively and non-limitingly in the enclosed drawings in which:

FIG. 5c is a schematic representation of a third communication architecture between the management and control modules of the hybrid drive assembly according to the invention;

FIG. 5d is a schematic representation of a fourth communication architecture between the management and control modules of the hybrid drive assembly according to the invention;

DETAILED DESCRIPTION OF THE INVENTION

Figure 1:
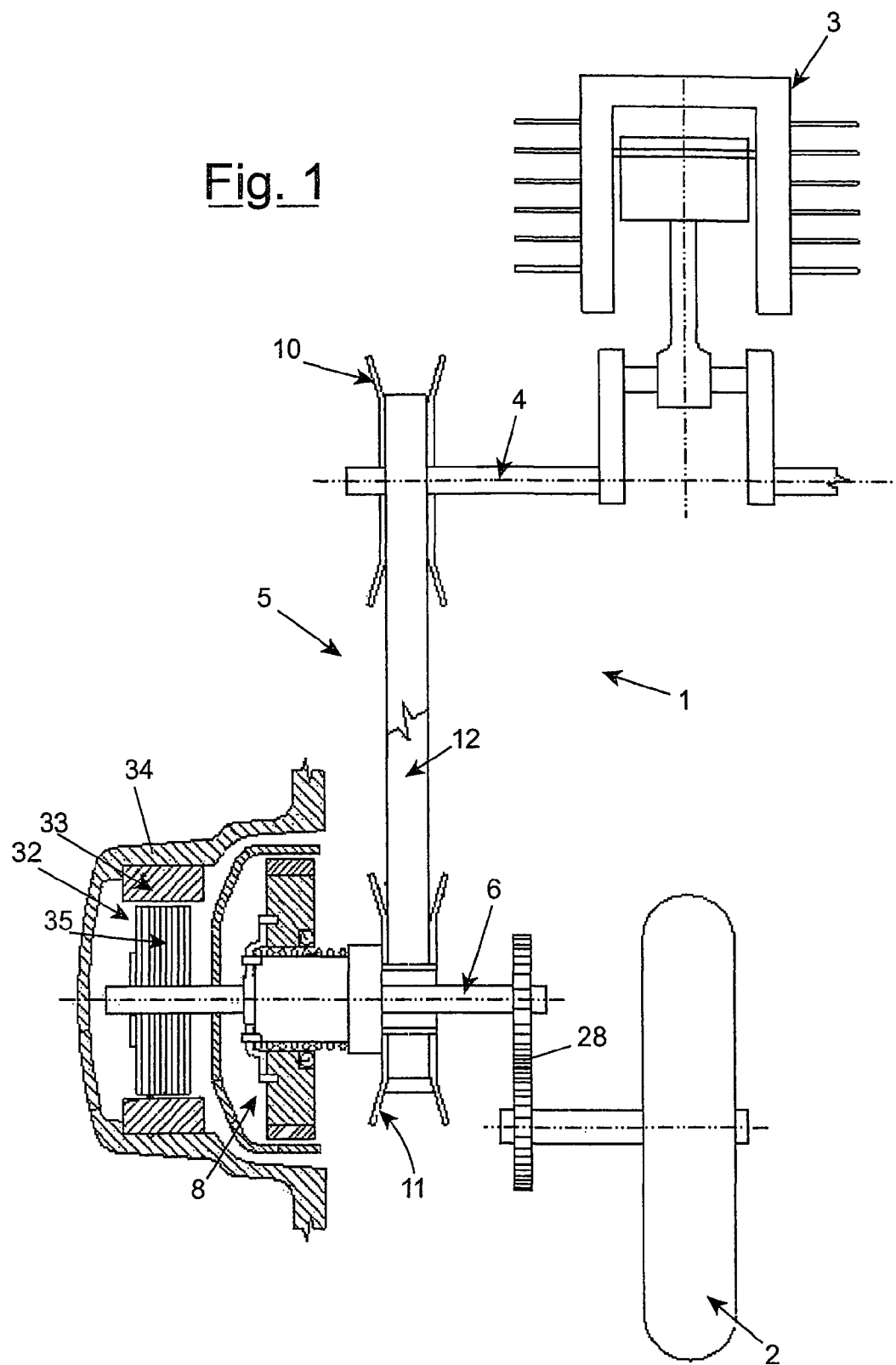
FIG. 1 is a schematic representation of a first embodiment of the hybrid drive assembly for scooters using the method according to the invention.

With reference to the above figures, the hybrid drive assembly 1 for scooters using the method according to the invention comprises a internal combustion engine 3 equipped with a drive shaft 4 connected by means of a transmission unit 5 to a motion transmission shaft 6 in turn coupled with a driving wheel 2 by means of a reduction 28.

The transmission unit 5 comprises a driving pulley 10, a driven pulley 11 and a belt 12 wound around the pulleys 10, 11. The driven pulley 11 is selectively connectable to the transmission shaft 6 by means of a centrifugal clutch 8. The hybrid drive assembly 1 also comprises an electric machine 32 coaxial to the clutch 8 but situated at a different axial position on the transmission shaft 6.

In particular, the electric machine 32 has a stator 33 fitted on a fixed casing 34 coaxially to the transmission shaft 6, and a rotor 35 fitted directly onto the transmission shaft 6.

This innovative arrangement of the electric machine 32 guarantees a reduction in the encumbrances in a radial direction with respect to the electric machines of the known type and reduces the inertia of the rotor part of the electric machine 32.

Furthermore, in the arrangement described, the rotor 35 of the electric machine 32 is not subject to stress due to the heat produced by the centrifugal clutch 8.

The electric machine 32 used in the illustrative embodiment described, consists of a stator 33 with windings of the three-phase type and a rotor 35 with permanent magnets, positioned inside the rotor itself 35. The arrangement of the magnets is such as to produce an asymmetry in the magnetic rotor circuit.

For its functioning, the electric machine 32 is capable of exploiting both the contribution of the magnets present on the rotor and the anisotropy of the magnetic rotor circuit. It is therefore capable of rotating in both directions and absorbing or supplying torque. It is consequently used both for supplying propulsive torque to the scooter by taking energy from an accumulator system 36 or taking braking torque by recovering energy in the accumulator system 36.

The internal combustion engine (3) and/or the electric machine (32) may be operated so as to satisfy the required torque and/or to bring the accumulator system (36) to a pre-established charge level and/or operate said internal combustion engine (3) under maximum efficiency conditions when the torque required is positive and lower than the maximum torque which can be applied by said internal combustion engine. A series of parameters and/or commands used in determining the torque required and the vehicle state are selected from the group consisting of;

the management strategy of said vehicle;
the rotation of an accelerator handle (44) of said vehicle;
the state of at least one brake (45) of said vehicle;
the rotation speed of a rotor (35) of said electric machine (32)
the torque supplied by the internal combustion engine (3)
the rotation speed of the internal combustion engine (3);
the angular position of a butterfly valve (40) of said internal combustion engine (3);
the air flow inside said internal combustion engine (3); and
the charge state of said accumulator system (36) and combinations thereof.

For this purpose, the control electronics 50 of the electric machine 32 consists of a first electronic device 51 for feeding the phases of the electric machine (inverter) and a second electronic device 52 with a high frequency transformer to raise the input voltage (booster).

This second device 52 is capable of regulating the output voltage regardless of the variations in the input voltage, due to the accumulator system 36, through the use of an input inductance.

Figure 2:
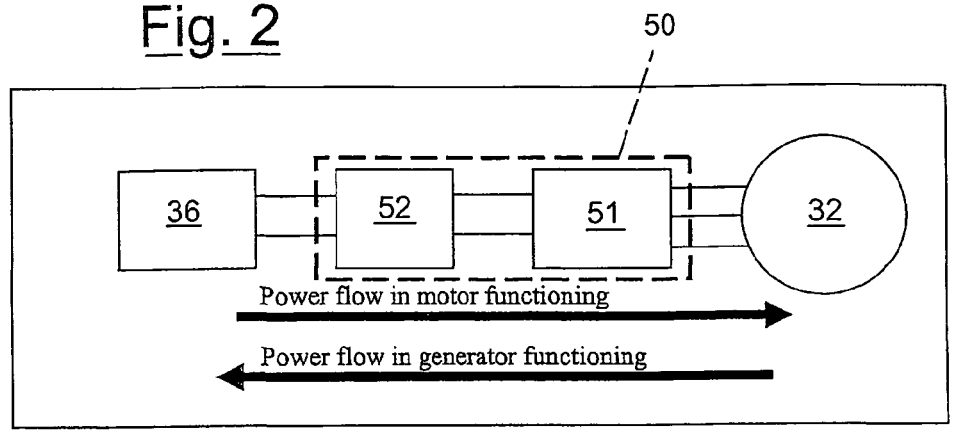
FIG. 2 is a scheme of the power flows exchanged between the accumulator system and the electric machine depending on the operative modes selected.

As shown in FIG. 2, both of the devices 51, 52 allow the passage of power in both directions: from the accumulator system 36 to the electric machine 32 and vice versa.

The accumulator system 36 envisages the use of various kinds of batteries such as, for example, lead, lead-gel, nickel-metal hydride, lithium batteries and so forth, with or without supercondensers and a suitable management and control electronics (not shown).

The energy accumulator system has the possibility of being recharged by means of an external battery-charger, as normally occurs. A further characteristic of the above control electronics 50 is to allow the energy system to be directly recharged through the electric machine 32, avoiding the use of an external battery-charger.

Figure 3:
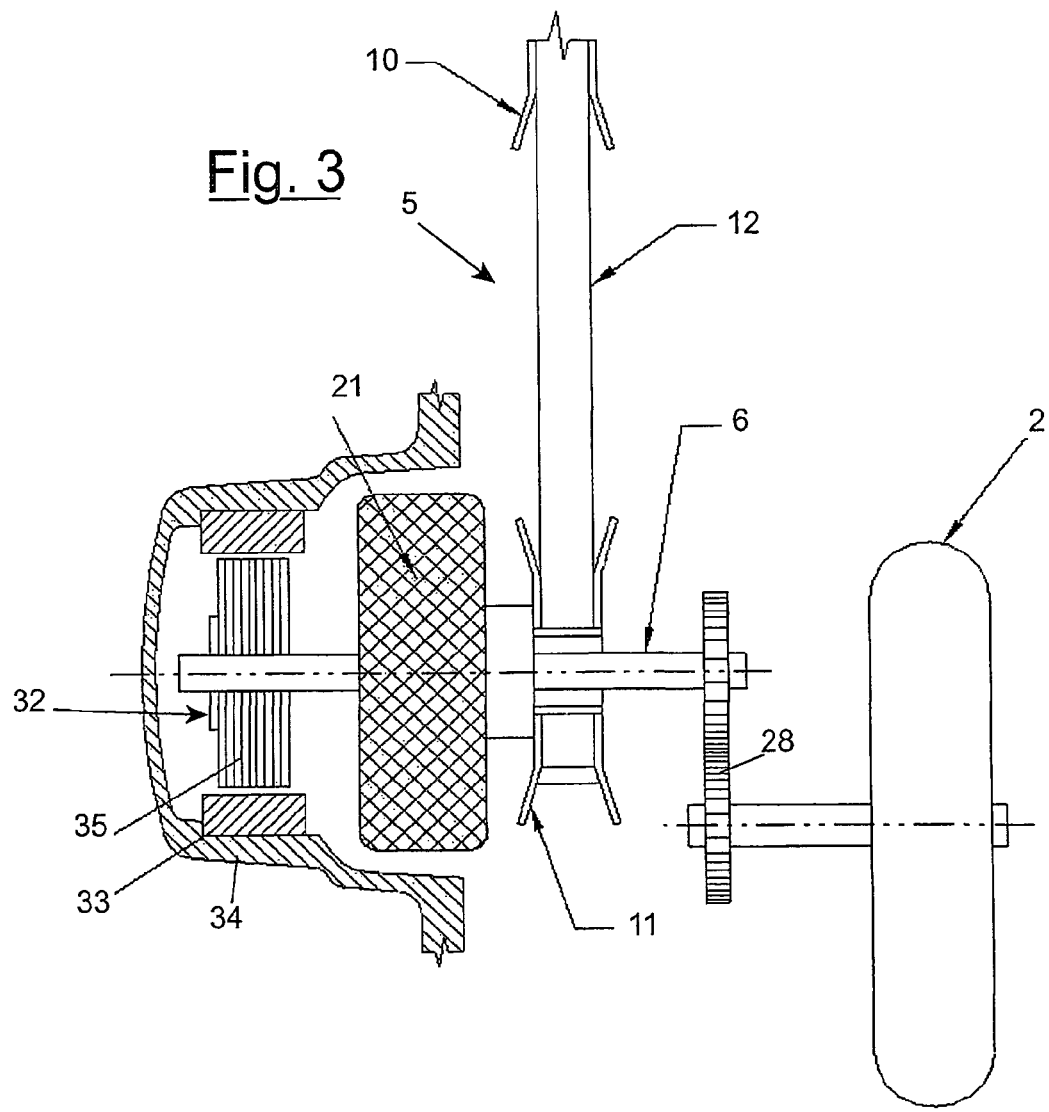
FIG. 3 is a schematic representation of a second embodiment of the hybrid drive assembly for scooters using the method according to the invention.

In a second embodiment illustrated in FIG. 3, the use is envisaged of a driven clutch 21 in substitution of the centrifugal mass clutch 8. This solution allows the internal combustion engine 3 to be permanently coupled and decoupled with the driving wheel 2 and the electric motor 32 integral therewith only when required by the system. With the use of the driven clutch 21 there is the advantage of being able to activate the internal combustion engine 3 through the electric motor 32 performing the "idle-stop" strategy: when the vehicle is at a standstill, the internal combustion engine 3 is switched off and, after being restarted with electric propulsion alone, can be reignited exploiting the electric machine 32, used for the propulsion, which is made integral with the shaft 4 of the internal combustion engine 3 by means of the driven clutch.

This second embodiment also allows the drive assemby to be configured as "hybrid-series" with the electric motor which provides for the propulsion and the internal combustion engine which, when functioning, always operates in the maximum efficiency points and, through an electric generator assembled on an outlet axis of the internal combustion engine, recharges the batteries.

The system consisting of the internal combustion engine 3, the accumulator system 36 and the electric machine 32 comprising the relative control electronics 50, is managed so as to guarantee a high operative performance.

The accumulator system 36 onboard the vehicle is in fact used for supplying energy or recharged through the same control electronics 50 of the electric machine 32 in an optimized way depending on the energy management strategy selected.

For this purpose, there is an energy management unit 38 capable of suitably operating the electric machine 32 and the internal combustion engine 3, by means of specific control devices 39, 50, on the basis of a series of received input parameters and/or commands. The energy management unit 38 is in fact capable of interpreting the requests of the pilot in terms of functioning modes and propulsion torque, thus managing in an optimized way the integrated functioning of the internal combustion engine 3 and electric machine 32 and the charge level of the accumulator system 36.

Various solutions are envisaged for the physical embodiment of the electronic control devices 38, 50, 39, 36.

The solution defined as "compact" comprises the housing of the various control electronics 38, 50, 39, 36 described above on the same electronic device. In the solution defined as "distributed", on the other hand, the various control electronics 38, 50, 39, 36 are housed in different devices placed in various points on the vehicle.

Intermediate solutions are provided as well in which two or more devices are present on the vehicle, which implement one or more control electronics in their interior.

For the solutions which envisage two or more devices distributed on the vehicle, for a correct functioning of the system, there is the problem of information exchange between the various control electronics. For this purpose, the use is envisaged of a communication line 75 which uses the CAN (Control Area Network) protocol.

Figure 5A:
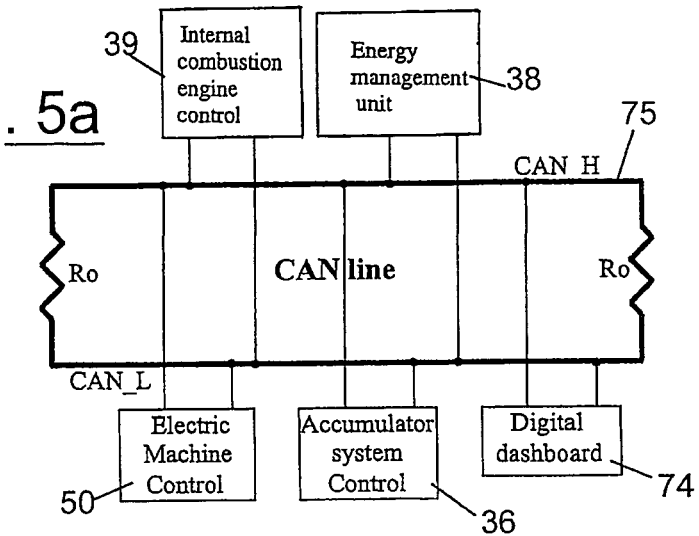
FIG. 5a is a schematic representation of a first communication architecture between the management and control modules of the hybrid drive assembly according to the invention.

FIG. 5a illustrates the CAN communication network 75, with the relative nodes, used in a preferred embodiment of the vehicle equipped with a hybrid drive assembly using the method according to the invention.

Figure 4:
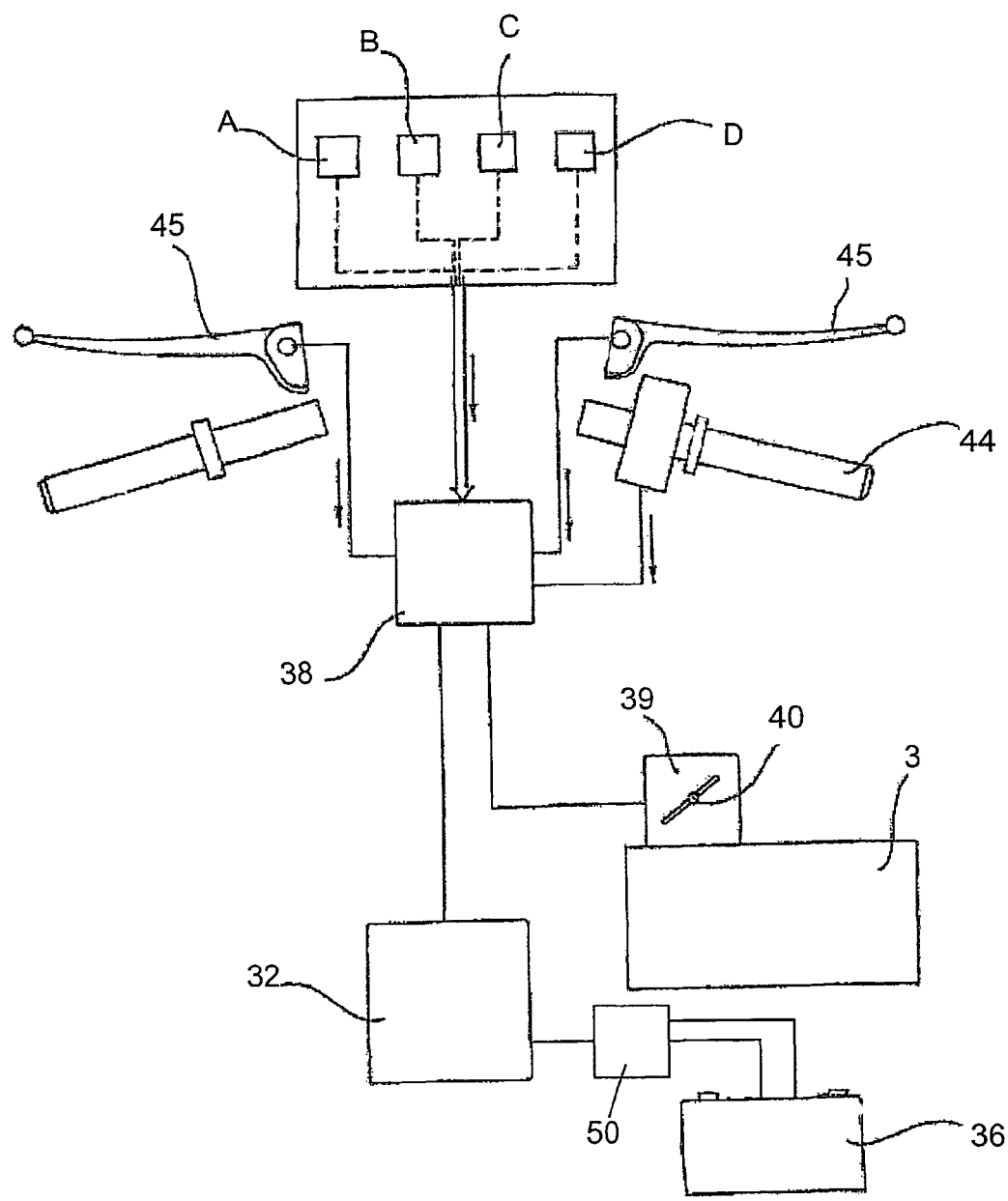
FIG. 4 is a scheme of the control system of the optimized energy management of the drive assembly.

Each CAN node is associated with an electronic device with the following functionalities:

"Electric Machine Control" node: this corresponds to the control electronics 50 of the electric machine 32. The device sends information onto the CAN line 75 relating to the electric activation and receives the various activation command signals from the same line;

"Internal combustion engine Control" node: this corresponds to the control electronics 39 of the functioning of the internal combustion engine. The device sends information onto the CAN line 75 relating to the internal combustion engine and receives the various activation command signals from the same line;

"Digital Dashboard" node: this corresponds to a visualization device 74 that gives the pilot information on the functioning state of the vehicle. The device receives input signals to be visualized and can optionally send information on various signals which could be acquired, for example the position of the accelerator handle 44 and others defined in detail hereunder (FIG. 4);

"Accumulator System Control" node: this corresponds to the accumulator system 36 present on the vehicle, which sends information onto the CAN line relating to its charge level and receives the various command and control input signals;

"Energy Management System" node: this corresponds to the energy management unit 38. This device receives the signals sent from the other devices 50, 39, 74, 36 from the CAN line 75 and sends the various command and control signals to the different devices.

Figure 5B:
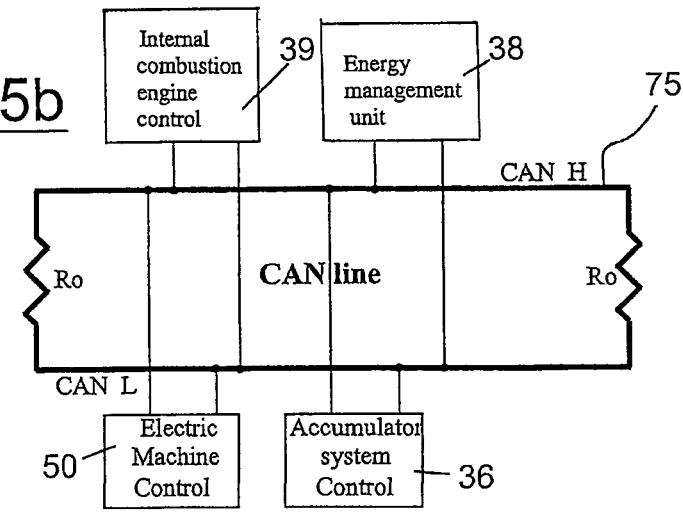
FIG. 5b is a schematic representation of a second communication architecture between the management and control modules of the hybrid drive assembly according to the invention.

The visualization device 74 can be substituted with an equivalent dashboard with analogical indicators, consequently eliminating the "Digital Dashboard" node on the CAN line 75. An example of this solution is represented in FIG. 5b.

If a solution with lead batteries is used, for example, for obtaining the accumulator system 36, the "Accumulator System Control" node may not be present on the line 75. In this case, it will be one of the other devices present on the vehicle which acquires the characteristic values of the accumulator system 36 and possibly transmit the data via CAN 75. An example of this solution is provided in FIG. 5c.

If the energy management unit 38 is implemented on the same hardware support of one of the control devices 50, 39 present on the vehicle, the "Energy Management System" node can be eliminated. In this case, the control device 50, 39 which implements the functionalities of the energy management unit 38 will perform the relative management operations. An example of this solution is illustrated in FIG. 5d.

The method implemented by the energy management unit 38 for managing the functioning modes of the hybrid drive assembly is described hereunder.

In general terms, in order to select the optimum functioning mode of the hybrid drive assembly 1, the energy management unit 38 performs the following steps:

a) the energy management unit 38 receives at the a series of input parameters and/or commands, among which the management strategy established by the pilot through the selectors A, B, C, D, the rotation of the accelerator handle 44, the state of the brake 45, the rotation speed of the rotor 35 of the electric machine 32, the angular position of the butterfly valve 40, the torque supplied by the internal combustion engine 3, the rotation speed of the internal combustion engine 3 and the charge state of the accumulator system 36;

b) on the basis of the input parameters and/or commands received, the energy management unit 38 determines the state of the vehicle and torque requested by the pilot;

c) on the basis of the values determined under step b) both the internal combustion engine 3 and the electric machine 32 are operated so that the sum of the torque supplied by both motorizations is equal to that requested by the pilot.

The management method of the functioning mode of the hybrid drive assembly according to the invention envisages that the pilot can select from the following management strategies:

Pure electric, in which the electric machine alone is used for the propulsion;

Standard hybrid, in which both the electric machine and the internal combustion engine are used for the propulsion and the energy management unit 38 maintains the charge state of the batteries at a prefixed level;

High charge hybrid, in which the energy management unit 38 manages the two machines so as to satisfy the torque requested by the pilot and attempt to charge the accumulator system as much as possible;

Low charge hybrid, in which the energy management unit 38 manages the two machines so as to satisfy the torque requested by the pilot and minimize the fuel consumptions using the energy contained in the accumulator system.

In the pure electric strategy, the clutch 8 mechanically decouples, in a permanent way, the internal combustion engine 3 from the electric machine 32 and consequently also from the driving wheel 2 of the vehicle integral therewith. In this mode, when the torque required is positive, it is supplied by the electric machine 32 alone, whereas if the torque required is negative, a braking torque is required for the electric machine 32.

With particular reference to the combined management strategies of the accumulation and/or traction system, the energy management unit 38 is capable, according to the management strategy selected by the pilot, of operating in the following operative modes:

I) using part of the power supplied by the internal combustion engine for recharging the batteries through the electric machine, which functions as generator;

II) using the electric machine in substitution of part of the power needed for the propulsion supplied by the internal combustion engine, using the energy stored in the accumulator system;

III) contemporaneously using, at the maximum power which can be supplied by the internal combustion engine, the power supplied by the electric machine;

IV) managing the two machines so as to maintain a certain charge level in the accumulator system.

Figure 6:
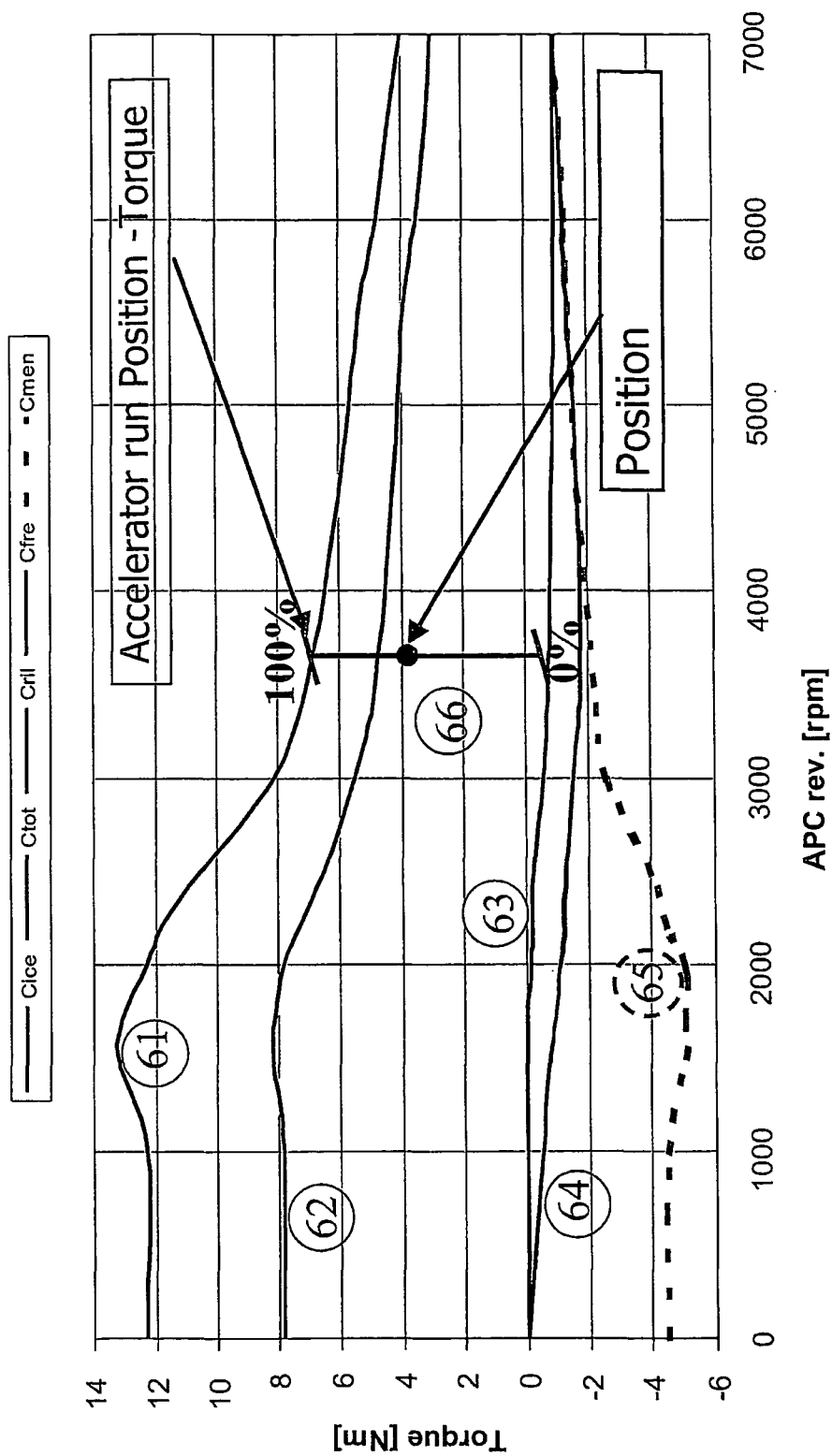
FIG. 6 is a graphic representation of the processing of the input commands of the energy management device.

With reference to FIG. 6, an illustrative explanation is provided of how the energy management device 38 determines, according to the combined management strategy selected, in which operative mode the internal combustion engine 3 and the electric machine must be operated.

FIG. 6, with the reference number 61, indicates the maximum torque available resulting from the sum of the maximum torque which can be supplied by the internal combustion engine and the maximum torque which can be supplied by the electric motor; the curve relating to the maximum torque available of the internal combustion engine alone is indicated with the reference number 62; the number 63 refers to the torque absorbed by the electric machine in deceleration; the braking torque absorbed by the electric machine during braking is identified with the number 64; the number 65 indicates the maximum torque which the electric machine can absorb when functioning as generator; finally the number 66 refers to the total percentage run of the accelerator.

During the functioning of the vehicle, the vertical segment 66 of the accelerator run remains between the maximum propulsive torque 61 and the braking torque absorbed by the electric machine in deceleration 63, but it moves at the rotation speed of the driven pulley 11.

For each instant of time t, the energy management unit 38 positions the vertical segment 66 at the value of the number of rotation revs of the driven pulley 11 and indicates in percentage on said segment the present position of the accelerator handle 44.

The point thus fixed corresponds on the axis of the ordinates to a torque value. This value is interpreted as a torque requested by the pilot.

In the case of the combined standard hybrid management strategy, the request of torque is managed differently according to the area, among the following three, in which it falls:

between the line 63 identifying the braking torque absorbed by the electric machine in deceleration and the horizontal axis. In this case the torque required is negative: the energy management unit 38 controls the closing of the butterfly valve 40 and, optionally, closes the fuel supply through the control device 39 and, above a certain velocity, sends a negative torque reference to the electric machine 32 which is called to act as generator, recuperating energy in the battery;

between the horizontal axis and the line 62 identifying the maximum propulsive torque available of the internal combustion engine alone. The torque required in this case is positive and lower than the maximum suppliable torque of the internal combustion engine; the energy management unit 38 controls the opening of the butterfly valve 40 through the control device 39 so as to regulate the supply of air-gasoline mixture inside the combustion chamber and sends a reference to the electric machine 32 (positive or negative) in order to satisfy the requested torque, control the charge state level and optimize the functioning of the internal combustion engine 3;

between the line 62 and the line 61 relating to the maximum propulsive torque available. In this case, the torque required is higher than the maximum suppliable torque of the internal combustion engine 3: the energy management unit 38 controls the opening of the butterfly valve 40 through the control device 39 so that the internal combustion engine 3 supplies the maximum torque and sends a positive torque reference to the electric machine 32 to satisfy the higher torque requested by the pilot.

Finally, if the pilot activates the braking lever 45, the energy management unit 38 sends a negative torque reference to the electric machine 32 equal to the corresponding torque value on the curve 64 at the given rotation speed of the driven pulley 11.

The combined high charge hybrid management strategy has the purpose of allowing a recharging as rapid as possible of the accumulator system 36, subsequently maintaining the charge state at the maximum value reached.

When the torque required is between line 62 identifying the maximum torque available of the internal combustion engine 3 alone and line 61 relating to the maximum torque available, the maximum torque value in relation to the number of revs is determined so as not to significantly jeopardize the performances of the vehicle when accelerating. In this way, the propulsive torque supplied by the electric machine is limited and consequently the energy is taken from the batteries.

When, on the other hand, the torque required is between the horizontal axis and line 62, the internal combustion engine will supply all the necessary torque for the propulsion. Furthermore, if it is operating in maximum efficiency areas, the system will use its torque in excess with respect to that required, to recharge the accumulator system, using the electric machine as a generator.

In the deceleration and braking phases, the system functions in the same way as in the standard hybrid mode, using the electric machine as a generator, recharging energy in the accumulator system.

In the low charge hybrid mode, the aim is to privilege the use of the energy present in the electric machine 32 rather than that coming from the fuel, so as to reduce fuel consumption.

The substantial difference with the control used in the standard hybrid mode can be found when the torque requested by the pilot falls within the area between the horizontal axis and line 62: the electric machine 32 supplies a part of the torque required, whereas the remaining part is provided by the internal combustion engine 3. The torque required by the electric machine 32 must in any case be such as to maintain the functioning of the internal combustion engine 3 within a maximum efficiency area.

If the internal combustion engine 3 is not a carburetor engine but an injection engine, for the control of the torque supply, an electronic device 39 capable of regulating the air supply inside the engine and automatically managing the parameters characteristic of injection engines is provided.

It has in fact been verified that the method according to the invention thus described, guarantees a management of the functioning mode of hybrid drive assemblies which is such as to reach a high functioning performance in terms of optimization of the energy management.

It has in fact been ascertained that the electric machine is operated as a motor or as a current generator depending on the energy consumption optimization requirements. The particular inventive management allows the electric machine to maintain the charge state at a pre-established value, which can correspond to the maximum charge or another preset value, or contribute to the propulsive torque supply so as to allow the internal combustion engine to operate in a optimized way.

It has also been verified that the hybrid drive assembly for scooters described is capable of implementing the management method of the operative mode according to the invention.

The invention thus conceived can undergo numerous modifications, additions and variants, all included in the scope of the inventive concept.

The protection scope defined by the claims should therefore not be considered as being limited by the preferred embodiments illustrated in the description and figures in the form of examples, but should comprise all the patentable novelty characteristics which are inherent in the present invention, comprising the characteristics which are considered as being equivalent by experts in the field.

The invention claimed is:

1. A method of managing the functioning mode of a hybrid drive assembly of a scooter, where said scooter comprises: (a) at least one internal combustion engine (3) equipped with a drive shaft (4) connected by means of a transmission unit (5) which comprises a driving pulley (10) a driven pulley (11) and a belt (12) wound around the pulleys (10,11) where the driven pulley (11) is selectively connectable to transmission shaft (6) by means of a centrifugal clutch (8,21) and (b) one electric machine (32) coaxial to the clutch (8,21) and to the transmission shaft (6) having a stator (33) and a rotor (35) with permanent magnets that are positioned in said rotor, said electric machine (32) being capable of rotation in two directions and being configured to be controlled for being alternatively operated for supplying propulsive torque to the scooter by taking energy from an accumulator system (36) or recharging said accumulator system (36), in the latter case functioning as a generator said method comprising the steps of:

a) determining a required torque and a vehicle state based on a series of received input parameters and/or commands;

b) operating said internal combustion engine (3) so that it does not supply torque and operating the electric machine (32), sending to said machine (32) a negative torque reference so that said electric machine (32) functions as a generator for charging said, accumulator system (36), when said required torque is negative;

c) operating said internal combustion engine (3) and/or said electric machine (32) so as to:
   satisfy said required torque; and/or
   bring said accumulator system (36) to a pre-established charge level and/or operate said internal combustion engine (3) under maximum efficiency regime conditions, when the torque required is positive and lower than the maximum torque which can be supplied by said internal combustion engine (3);

d) operating said internal combustion engine (3) to supply propulsive torque and operating said electric machine (32), sending to said electric machine (32) a positive torque reference to supply propulsive torque, in order to satisfy said torque required, when said torque required is positive and higher than the maximum torque which can be supplied by said internal combustion engine (3).

2. The management method of the functioning mode of a hybrid drive assembly according to claim 1, wherein said series of parameters and/or commands used in determining said torque required and said vehicle state is selected from the group consisting of:

the management strategy of said vehicle;
the rotation of an accelerator handle (44) of said vehicle;
the state of at least one brake (45) of said vehicle;
the rotation speed of a rotor (35) of said electric machine (32) the torque supplied by the internal combustion engine (3) the rotation speed of the internal combustion engine (3);
the angular position of a butterfly valve (40) of said internal combustion engine (3);
the air flow inside said internal combustion engine (3);—
the charge state of said accumulator system (36) and combinations thereof.

3. The management method of the functioning mode of a hybrid drive assembly according to claim 2, wherein said command relating, to the management strategy, of said vehicle can be selected from the group consisting of:

pure electric operative mode, in which the electric machine (32) alone is used for the propulsion;
standard hybrid operative mode, in which both the electric machine (32) and the internal combustion engine (3) are used for the propulsion and the charge skate of the accumulator system (36) is maintained at a prefixed level;
high charge hybrid operative mode, in which both the electric machine (32) and the internal combustion engine (3) operate so as to satisfy the torque required and charge the accumulator system (36) as much as possible;
low charge hybrid operative mode, in which both the electric machine (32) and the internal combustion engine (3) are operated so as to satisfy the torque required while minimizing the fuel consumptions.

4. The management method of the functioning mode of a hybrid drive assembly according to claim 3, wherein, when said management strategy is the standard hybrid operative mode:

in said phase c) said internal combustion engine (3) is driven so as to supply all the torque required, also using a torque in excess for the recharging of said accumulator system (36) to a pre-established charge level, if said accumulator system (36) has a charge level lower than said pre-established level; and in said phase d) said internal combustion engine (3) is driven so as to supply the maximum suppliable torque and said electric machine (32) is driven so as to satisfy the higher torque request.

5. The management method of the functioning mode of as hybrid drive assembly according to claim 3, wherein, when said management strategy is the standard hybrid operative mode
   in said phase c) said internal combustion engine (3) is driven so as to operate under maximum efficiency regime conditions, wherein said accumulator system (36) is substantially at a pre-established charge level, and said electric machine (32) is driven so as to satisfy the higher torque request; and
   in said phase d) said internal combustion engine (3) is driven so as to supply the maximum suppliable torque and said electric machine (32) is driven so as to satisfy the higher torque request.

6. The management method of the functioning mode of a hybrid drive assembly according to claim 3, wherein, when said management strategy is the high charge hybrid operative mode:
   in said phase c) said internal combustion engine (3) is driven so as to supply all the torque required, using a torque in excess for the recharging of said accumulator system (36) if said internal combustion engine (3) is operating under maximum efficiency regime conditions; and
   in said phase d) said electric machine (32) is driven so as to supply a limited propulsive torque and said internal combustion engine (3) is driven so as to supply the maximum suppliable torque.

7. The management method of the functioning mode of a hybrid drive assembly according to claim 3, wherein, when said management strategy is the low charge hybrid operative mode:
   in said phase c) said internal combustion engine (3) is driven so as to operate under maximum efficiency regime conditions and said electric machine (32) is driven so as to satisfy the higher torque request; and
   in said phase d) said internal combustion engine (3) is driven so as to supply the maximum suppliable torque and said electric machine (32) is driven so as to satisfy the higher torque request.

8. The management method of the functioning mode of a hybrid drive assembly according to claim 1, also comprising the phase of sending a negative torque reference to the electric machine (32) at the activation of at, least one brake (45).

9. The management method of the functioning mode of a hybrid drive assembly according to claim 3, wherein, when said management strategy is the pure electric operative mode:
   in said phase b) said electric machine (32) supplies a braking torque;
   in said phases c) and d) said electric machine alone (32) is driven so as to supply a propulsive torque.

10. A hybrid drive assembly for scooters, comprising (a) at least one internal combustion engine (3) equipped with a drive shaft (4) connected bye means of a transmission unit (5) which comprises a driving pulley (10), a driven pulley (11) and a (12) wound around the pulleys (10,11) where the driven pulley (11) is selectively connectable to transmission shaft (6) by means of a clutch (8,21) and (b) a least one electric machine (32), coaxial to the clutch (8,21) and to the transmission shaft (6), having a stator (33) and a rotor (35) with permanent magnets that are positioned in said rotor, said electric machine (32) being capable of rotation in two directions and being adapted for supplying propulsive torque to the scooter by taking energy from an accumulator system (36) and also being capable of functioning as a generator for recharging said accumulator system (36), said electrical machine being configured to be activated alternatively to or in combination with said internal combustion engine (3) characterized in that it comprises an energy management unit (38) for the operation of said at, least one internal combustion engine (3) and said at least one electric machine (32) in response to a series of input signals according to the method defined in claim 1.

11. The hybrid drive assembly according to claim 10 characterized in that said series of input signals corresponds to one or more parameters selected from the group consisting of:
   the management strategy of said vehicle,—
   the rotation of an accelerator handle (44) of said vehicle,—
   the state of at least one brake (45) of said vehicle;
   the rotation speed of a rotor (35) of said electric machine (32);
   the angular position of a butterfly valve (40) of said internal-combustion engine (3);—the torque supplied by the internal combustion engine (3);
   the rotation speed of the internal combustion engine (3);
   the air flow inside said internal combustion engine (3);
   the charge state of said accumulator system (36).

12. The hybrid drive assembly according to claim 10, characterized in that said electric machine (32) is of the reversible type.

13. The hybrid drive assembly according to claim 10 characterized in that said electric machine (32) comprises a stator (33) with windings of the three-phase type and a rotor (35).

14. The hybrid drive assembly according to claim 13 characterized in that said stator (33) is fitted on a fixed casing (34) coaxially to the transmission shaft (6) of said vehicle, and said rotor (35) is fitted directly onto said transmission shaft (6).

15. The hybrid drive assembly according to claim 14, characterized in that said control electronics (50) is used for recharging said accumulator system (36).

16. The hybrid drive assembly according to claim 10, characterized in that said rotor—BO-OS) has permanent magnets, said magnets being positioned inside the rotor (35) so as to produce an asymmetry in the magnetic circuit of the rotor.

17. The hybrid drive assembly according to claim 10, characterized in that said electric machine (32) has a control electronics (50) comprising a first electronic device (51) suitable for feeding the phases of said electric machine (32) and/or a second electronic device (52) suitable for raising the input voltage.

18. The hybrid drive assembly according to claim 17, characterized in that said first electronic device
   (51) is an inverter and said second electronic device
   (52) is a booster.

19. The hybrid drive assembly according to claim 17, characterized in that said second electronic device (52) is produced with a high frequency transformer.

20. The hybrid drive assembly according to claim 10, characterized in that said internal combustion engine (3) is driven by a control device (39) so as to supply a torque.

21. The hybrid drive assembly according to claim 20, characterized in that said energy management unit (38) is implemented on at least one selected from said control electronics (50) of said electric machine (32) and said control device (39) of said internal combustion engine (3).

22. The hybrid drive assembly according to claim 20, characterized in that said energy management unit (38) sends control signals to at least one selected from
   said control electronics (50) of said electric machine (32);

said control device (39) of said internal combustion engine (3);—said accumulator system (36);

a digital dashboard (74).

23. The hybrid drive assembly according to claim 22, characterized in that said energy management unit (38) communicates with said control electronics (50), control device (39), accumulator system (36) and digital dashboard (74) through a communication line (75).

24. The hybrid drive assembly according to claim 23, characterized in that said communication line (75) uses the CAN (Control Area Network) communication protocol.

25. The hybrid drive assembly according to claim 10, characterized in that said internal combustion engine (3) is coupled with a centrifugal mass clutch (8).

26. The hybrid drive assembly according to claim 10, characterized in that said internal combustion engine (3) is coupled with a driven clutch (21).

27. The hybrid drive assembly according to claim 26, characterized in that said electric machine (32) is used for starting the internal combustion engine (3) by performing the idle-stop strategy.

28. The hybrid drive assembly according to claim 26, characterized in that said electric machine (32) is driven so as to supply the required propulsion and said internal combustion engine (3) is driven so as to operate in the maximum efficiency points, recharging said accumulator system (36) through an electric generator assembled on an outlet axis of said internal combustion engine (3).

\* \* \* \* \*